United States Patent
Kim et al.

(10) Patent No.: US 7,961,279 B2
(45) Date of Patent: Jun. 14, 2011

(54) TRANSREFLECTIVE LIQUID CRYSTAL DISPLAY APPARATUS WITH SINGLE CELL-GAP AND REDUCED POWER CONSUMPTION

(75) Inventors: Il Gon Kim, Seoul (KR); Chul Ho Kim, Incheon (KR)

(73) Assignee: Samsung Electronics Co., Ltd. (KR)

( * ) Notice: Subject to any disclaimer, the term of this patent is extended or adjusted under 35 U.S.C. 154(b) by 175 days.

(21) Appl. No.: 11/524,010

(22) Filed: Sep. 19, 2006

(65) Prior Publication Data

US 2007/0216821 A1 Sep. 20, 2007

(30) Foreign Application Priority Data

Dec. 21, 2005 (KR) .................. 10-2005-0126740

(51) Int. Cl.
*G02F 1/1335* (2006.01)
*G02F 1/1343* (2006.01)
*G02F 1/136* (2006.01)

(52) U.S. Cl. .................. 349/114; 349/48; 349/39

(58) Field of Classification Search .......... 349/48, 349/114, 39
See application file for complete search history.

(56) References Cited

U.S. PATENT DOCUMENTS

| | | | | |
|---|---|---|---|---|
| 5,453,857 A * | 9/1995 | Takahara | .......... | 349/48 |
| 6,518,945 B1 * | 2/2003 | Pinkham | .......... | 345/92 |
| 6,670,941 B2 * | 12/2003 | Albu et al. | .......... | 345/98 |
| 6,731,306 B2 * | 5/2004 | Booth et al. | .......... | 345/690 |
| 6,864,883 B2 * | 3/2005 | Hector et al. | .......... | 345/204 |
| 7,084,848 B2 * | 8/2006 | Senda et al. | .......... | 345/92 |
| 7,084,849 B2 * | 8/2006 | Noguchi et al. | .......... | 345/96 |
| 7,084,942 B2 * | 8/2006 | Luo | .......... | 349/114 |
| 7,277,145 B2 * | 10/2007 | Luo | .......... | 349/114 |
| 2002/0047822 A1 * | 4/2002 | Senda et al. | .......... | 345/90 |
| 2003/0043138 A1 * | 3/2003 | Hector et al. | .......... | 345/209 |
| 2003/0058263 A1 * | 3/2003 | Huang | .......... | 345/691 |
| 2003/0076285 A1 * | 4/2003 | Albu et al. | .......... | 345/87 |
| 2003/0112213 A1 * | 6/2003 | Noguchi et al. | .......... | 345/96 |
| 2004/0196235 A1 * | 10/2004 | Koyama et al. | .......... | 345/89 |
| 2005/0018113 A1 * | 1/2005 | Shen et al. | .......... | 349/114 |
| 2006/0050208 A1 * | 3/2006 | Enomoto et al. | .......... | 349/114 |
| 2006/0066553 A1 * | 3/2006 | Deane | .......... | 345/98 |
| 2006/0125755 A1 * | 6/2006 | Noguchi et al. | .......... | 345/96 |
| 2007/0216821 A1 * | 9/2007 | Kim et al. | .......... | 349/38 |
| 2008/0055526 A1 * | 3/2008 | Ino | .......... | 349/114 |

FOREIGN PATENT DOCUMENTS

| | | |
|---|---|---|
| CN | 1402065 A | 3/2003 |
| CN | 1482505 A | 3/2004 |
| JP | 2000081606 A | 3/2000 |

* cited by examiner

*Primary Examiner* — K. Cyrus Kianni
(74) *Attorney, Agent, or Firm* — Innovation Counsel LLP (57) ABSTRACT

A transreflective liquid crystal display (LCD) apparatus with a single cell gap is presented, along with a method of driving the apparatus. The apparatus operates with low power consumption because its electro-optical characteristics in a transmissive region and a reflective region are equalized. The transreflective LCD apparatus includes first and second liquid crystal cells formed respectively in transmissive and reflective regions of a first subpixel, first and second thin film transistors connected respectively to the first and second liquid crystal cells, and first and second storage capacitors connected respectively to the first and second liquid crystal cells.

18 Claims, 7 Drawing Sheets

TRANSREFLECTIVE LIQUID CRYSTAL DISPLAY APPARATUS WITH SINGLE CELL-GAP AND REDUCED POWER CONSUMPTION

CROSS-REFERENCE TO RELATED APPLICATION

This patent application claims priority from Korean Patent Application No. 2005-0126740 filed on Dec. 21, 2005, the content of which is incorporated by reference herein.

BACKGROUND OF THE INVENTION

1. Field of the Invention

The present invention relates to a transreflective liquid crystal display (LCD) apparatus and driving method thereof, and more particularly, to a transreflective LCD apparatus with a single cell gap and driving method thereof, wherein low power consumption can be achieved by equalizing electro-optical characteristics in a transmissive region and a reflective region.

2. Description of the Related Art

Development of information technology has been accompanied by growths in both the market for personal communication devices such as cellular phones and the market for computers and televisions. Naturally, the quality of a display apparatus, which is the visual interface between these devices and the user, has become more important. As a result, a flat panel display, such as an LCD, a plasma display panel (PDP) and an organic light emitting diode (OLED), is increasingly used instead of a conventional cathode ray tube (CRT). Of the different types of flat panel displays, the LCD is the most widely used because it provides high-quality images and it can be manufactured in a wide range of sizes.

An LCD apparatus displays video images using light transmittance of liquid crystals. The LCD apparatus uses a light source because the liquid crystals do not emit light themselves. Typically, the LCD apparatus includes an LCD panel for displaying images and a backlight unit positioned at the rear of the LCD panel to provide light to the LCD panel. This type of LCD apparatus, which displays images by using light from the backlight unit, is commonly used. Although the transmissive LCD apparatus is advantageous in that it is possible to achieve high picture quality, power consumption increases due to the use of the backlight unit. Also, the suitability of transmissive LCD apparatus in portable communication devices is less than ideal because of poor visibility in the open air.

In order to overcome such shortcomings of the transmissive LCD apparatus, a study on a reflective LCD apparatus is actively being conducted. Unlike the transmissive LCD apparatus, the reflective LCD apparatus employs ambient light (for example, external illumination or solar light) as a light source. The reflective LCD apparatus can accomplish low power consumption because it does not use the backlight unit. The conventional reflective LCD apparatus, however, has a slow response speed because the transmission of moving pictures is not its system requirements, and its optical characteristics (e.g., contrast, reflectance) deteriorate. Furthermore, because the reflective LCD apparatus uses ambient light as a light source, its characteristics vary according to the position, intensity and color temperature of the light source compared to the transmissive LCD apparatus, thereby lowering its optical characteristics. Particularly, in the night or dark room where an ambient light source is scarcely provided, the reflective LCD apparatus can not act as the display apparatus unless the optical characteristics are optimized.

A transreflective LCD apparatus is a combination of the reflective and transmissive LCD apparatuses that have the advantages of both types of apparatuses. The transreflective LCD apparatus has a reflective region and a transmissive region existing within one sub-pixel. Transreflective LCD apparatuses can be divided into two groups: that that have double cell gaps and those that have single cell gaps.

Figure 1:
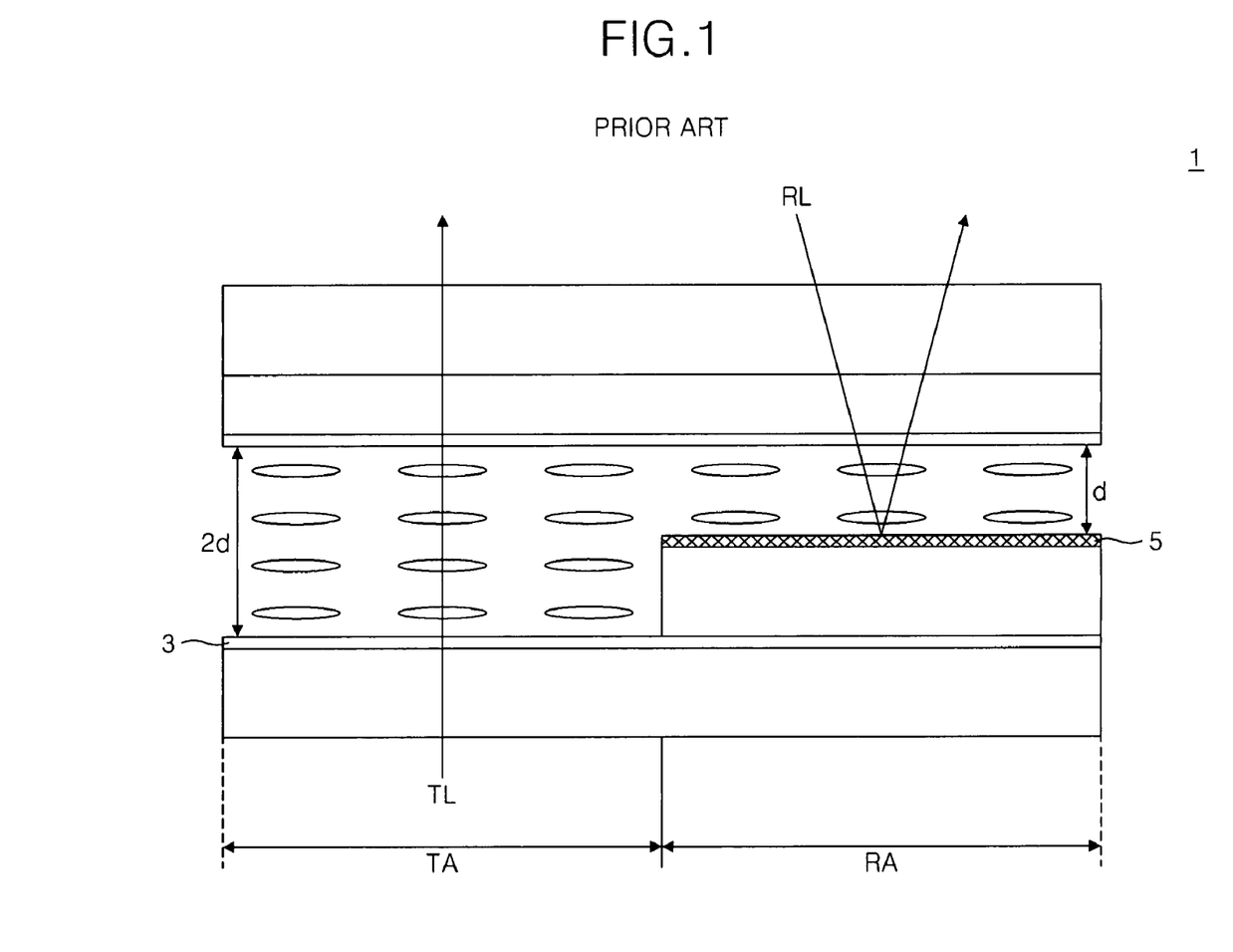
FIG. 1 is a cross-sectional view schematically illustrating a conventional LCD apparatus having a double cell gap.

FIG. 1 illustrates a transreflective LCD apparatus having a double cell gap. In the Figure, a cell gap $2d$ of transmissive region TA is twice the distance of the cell gap d of a reflective region RA. An optical passing distance of a transmissive light TL, which is emitted from a backlight unit and passes through a transmissive electrode 3 of the transmissive region TA, becomes identical to that of a reflective light RL which is emitted from an ambient light source and reflected by a reflective electrode 5 of the reflective region RA, thereby showing an enhanced transmittance characteristic. However, it is very difficult to control the cell gap d of the reflective region RA during the manufacturing process due to its thinness. As a result, the yield of a transreflective LCD apparatus 1 having double cell gaps is reduced.

Figure 2:
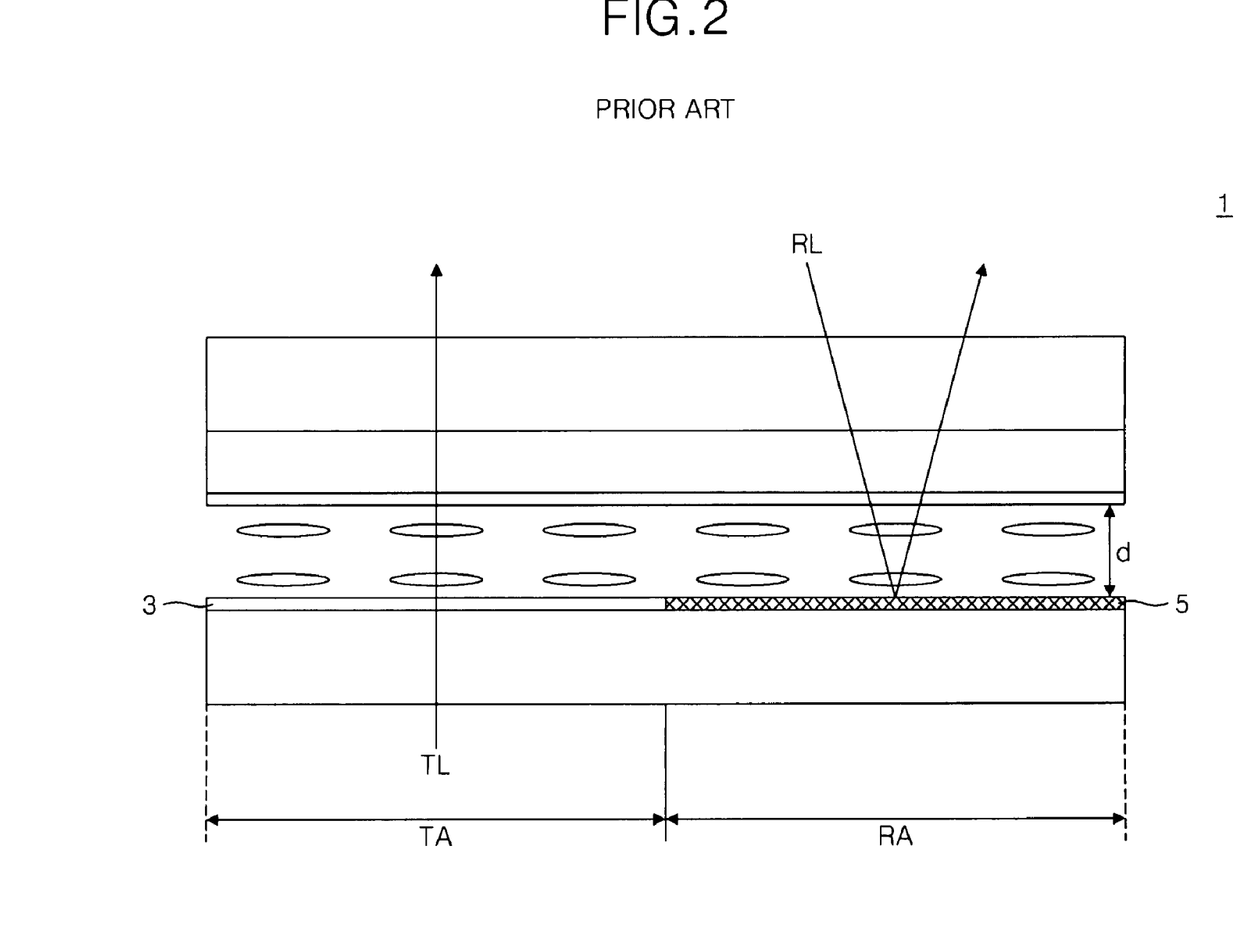
FIG. 2 is a cross-sectional view schematically illustrating a conventional LCD apparatus having a single cell gap.
Figure 3:
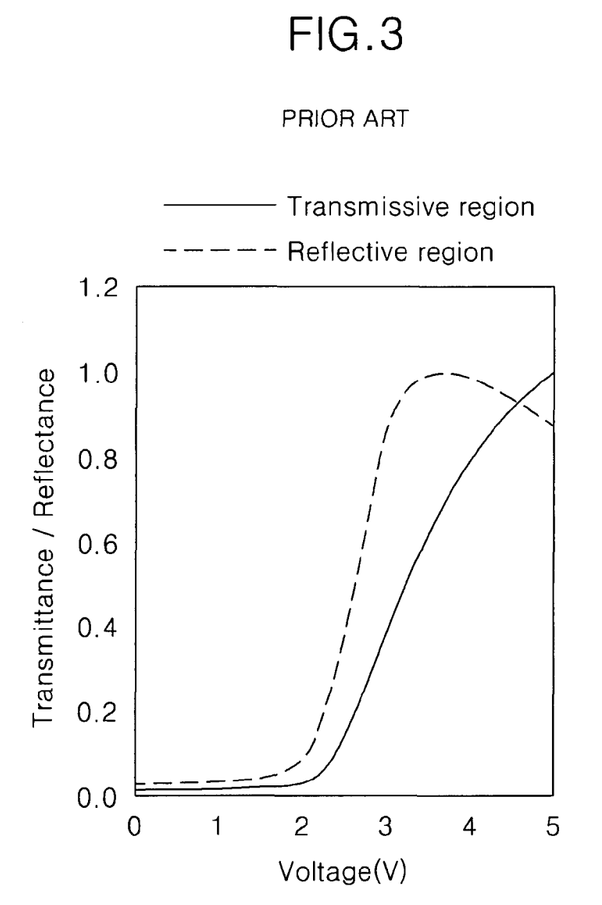
FIG. 3 is a view illustrating electro-optical characteristics in transmissive and reflective regions shown in FIG. 2.

In a transreflective LCD apparatus 1 having a single cell gap as illustrated in FIG. 2, a cell gap d of a transmissive region TA is the same as that of a reflective region RA. The transreflective LCD apparatus 1 having a single cell gap operates mostly in a mixed-mode twisted nematic (MTN) mode. In the MTN mode, however, since the optical passing distance of a transmissive light TL, which is emitted from a backlight unit and passes through a transmissive electrode 3 of the transmissive region TA, is different from that of a reflective light RL, which is emitted from an ambient light source and reflected by a reflective electrode 5 of the reflective region RA, it is difficult to identify the optimal design condition of liquid crystals simultaneously satisfying both an optical characteristic in the transmissive region and that in the reflective region. Furthermore, since electro-optical characteristics in the transmissive region TA and in the reflective region RA are different as illustrated in FIG. 3, different gamma voltages should be used with respect to the transmissive electrode and the reflective electrode. The use of different gamma voltages complicates the driving method of the LCD apparatus and reduces a charge time margin. Moreover, as the development of an additional driver integrated circuit (IC) is needed, power consumption increases.

SUMMARY OF THE INVENTION

The present invention provides a transreflective LCD apparatus with a single cell gap, wherein low power consumption can be achieved by equalizing electro-optical characteristics in a transmissive region and a reflective region. The invention also provides a method of driving the transreflective LCD apparatus.

In one aspect, the present invention is a transreflective LCD apparatus, including first and second liquid crystal cells formed respectively in transmissive and reflective regions of a first subpixel, first and second thin film transistors (TFTs) connected respectively to the first and second liquid crystal cells, and first and second storage capacitors connected respectively to the first and second liquid crystal cells.

The capacitances of the first and second storage capacitors may be different from each other. In some cases, the magnitudes of first and second storage electrodes of the first and second storage capacitors may be different from each other.

The transreflective LCD apparatus may further include third and fourth liquid crystal cells formed respectively in transmissive and reflective regions of a second subpixel adjacent to the first subpixel, third and fourth TFTs connected respectively to the third and fourth liquid crystal cells, and third and fourth storage capacitors connected respectively to the third and fourth liquid crystal cells. The capacitances of the third and fourth storage capacitors may be different from each other. Furthermore, the magnitudes of third and fourth storage electrodes of the third and fourth storage capacitors may be different from each other.

The transreflective LCD apparatus may further include fifth and sixth liquid crystal cells formed respectively in transmissive and reflective regions of a third subpixel adjacent to the second subpixel, fifth and sixth TFTs connected respectively to the fifth and sixth liquid crystal cells, and fifth and sixth storage capacitors connected respectively to the fifth and sixth liquid crystal cells. The capacitances of the fifth and sixth storage capacitors may be different from each other. Also, the magnitudes of fifth and sixth storage electrodes of the fifth and sixth storage capacitors may be different from each other. In some cases, the capacitances of the first, third and fifth storage capacitors are different from each other. The magnitudes of voltages applied to the first, third and fifth storage electrodes of the first, third and fifth storage capacitors may be different from each other. In some cases, capacitances of the second, fourth and sixth storage capacitors may be different from each other. The magnitudes of second, fourth and sixth storage electrodes of the second, fourth and sixth storage capacitors are different from each other.

The cell gaps of the first to sixth liquid crystal cells may be the same.

The transreflective LCD may further include a plurality of gate lines and a plurality of data lines intersecting each other to define the first to third subpixels, and a storage line formed alternately with the plurality of gate lines and connected to the first to sixth storage capacitors. A storage voltage of the storage line may be applied by line inversion, and the storage voltage swings during a period while a gate OFF voltage is applied to the gate lines.

In another aspect, the present invention is a method of driving a transreflective LCD apparatus. The method includes charging first and second liquid crystal cells to respective capacitances, wherein the first and second liquid crystal cells are formed in transmissive and reflective regions of a first subpixel, respectively, charging first and second storage capacitors to their respective capacitances, wherein the first and second storage capacitors are connected to the first and second liquid crystal cells, respectively, swinging a storage voltage of a storage line connected to the first and second storage capacitors, and bootstrapping a transmissive voltage of a first transmissive electrode of the first liquid crystal cell and a reflective voltage of a first reflective electrode of the second liquid crystal cell by different bootstrap voltages. The storage voltage may be applied by line inversion. The swinging may include swinging the storage voltage during a period while the first and second TFTs connected respectively to the first and second liquid crystal cells are turned off.

The method of driving a transreflective LCD further includes charging third and fourth liquid crystal cells to their respective capacitances, wherein the third and fourth liquid crystal cells are formed in transmissive and reflective regions, respectively, of a second subpixel adjacent to the first subpixel to have respective capacitances. The method also includes charging third and fourth storage capacitors to their respective capacitances, wherein the third and fourth storage capacitors are connected to the third and fourth liquid crystal cells, respectively, and to the storage line. The method also includes bootstrapping a transmissive voltage of a second transmissive electrode of the third liquid crystal cell and a reflective voltage of a second reflective electrode of the fourth liquid crystal cell by different bootstrap voltages, charging fifth and sixth liquid crystal cells to their respective capacitances, wherein the fifth and sixth liquid crystal cells are formed in transmissive and reflective regions, respectively, of a third subpixel adjacent to the second subpixel. The method also includes charging fifth and sixth storage capacitors connected respectively to the fifth and sixth liquid crystal cells and to the storage line to have respective capacitances, and bootstrapping a transmissive voltage of a third transmissive electrode of the fifth liquid crystal cell and a reflective voltage of a third reflective electrode of the sixth liquid crystal cell by different bootstrap voltages.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

The exemplary embodiments of the present invention will now be described with reference to the attached drawings.

Figure 4:
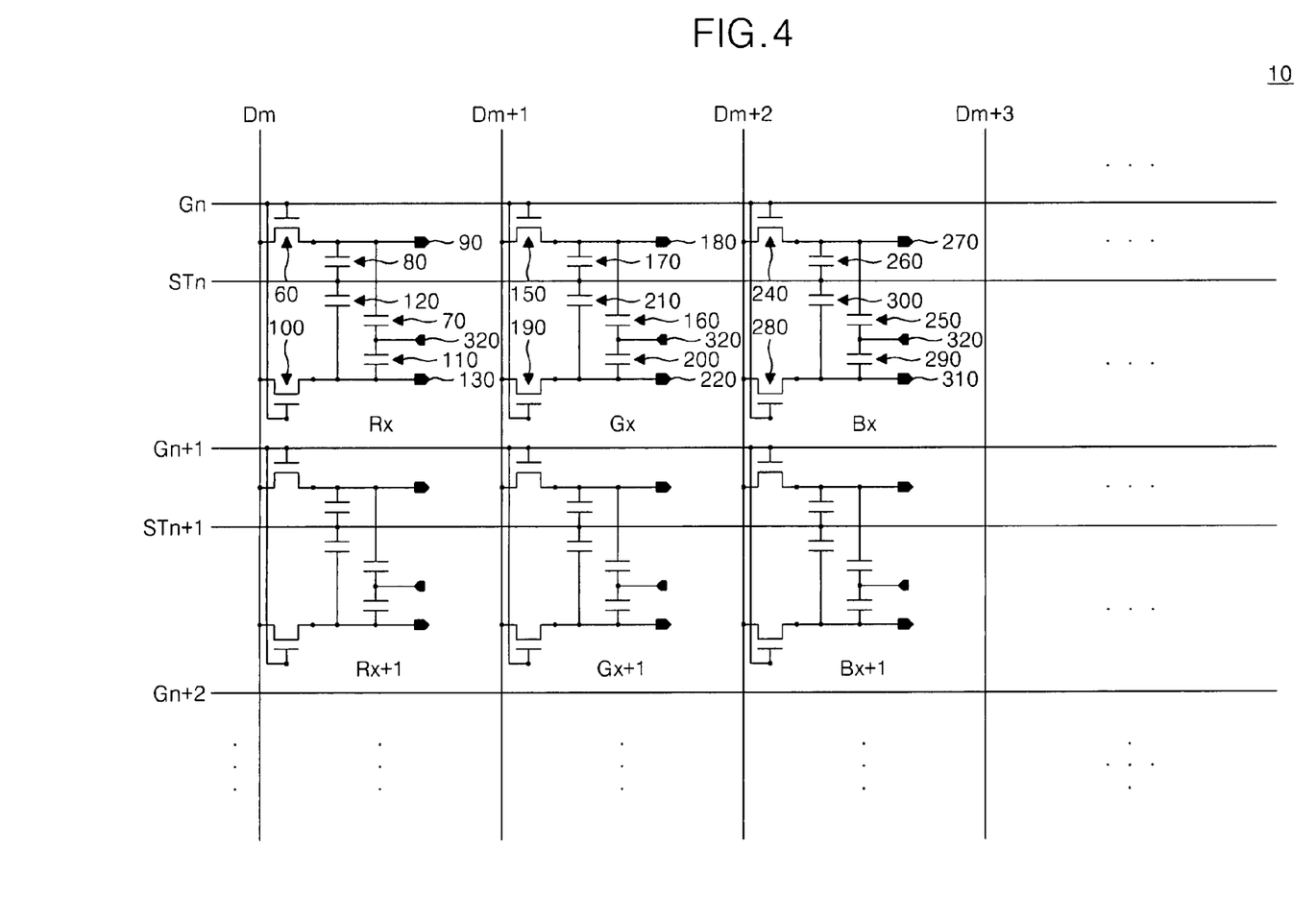
FIG. 4 is a circuit diagram of a transreflective LCD apparatus according to an exemplary embodiment of the present invention.
Figure 5:
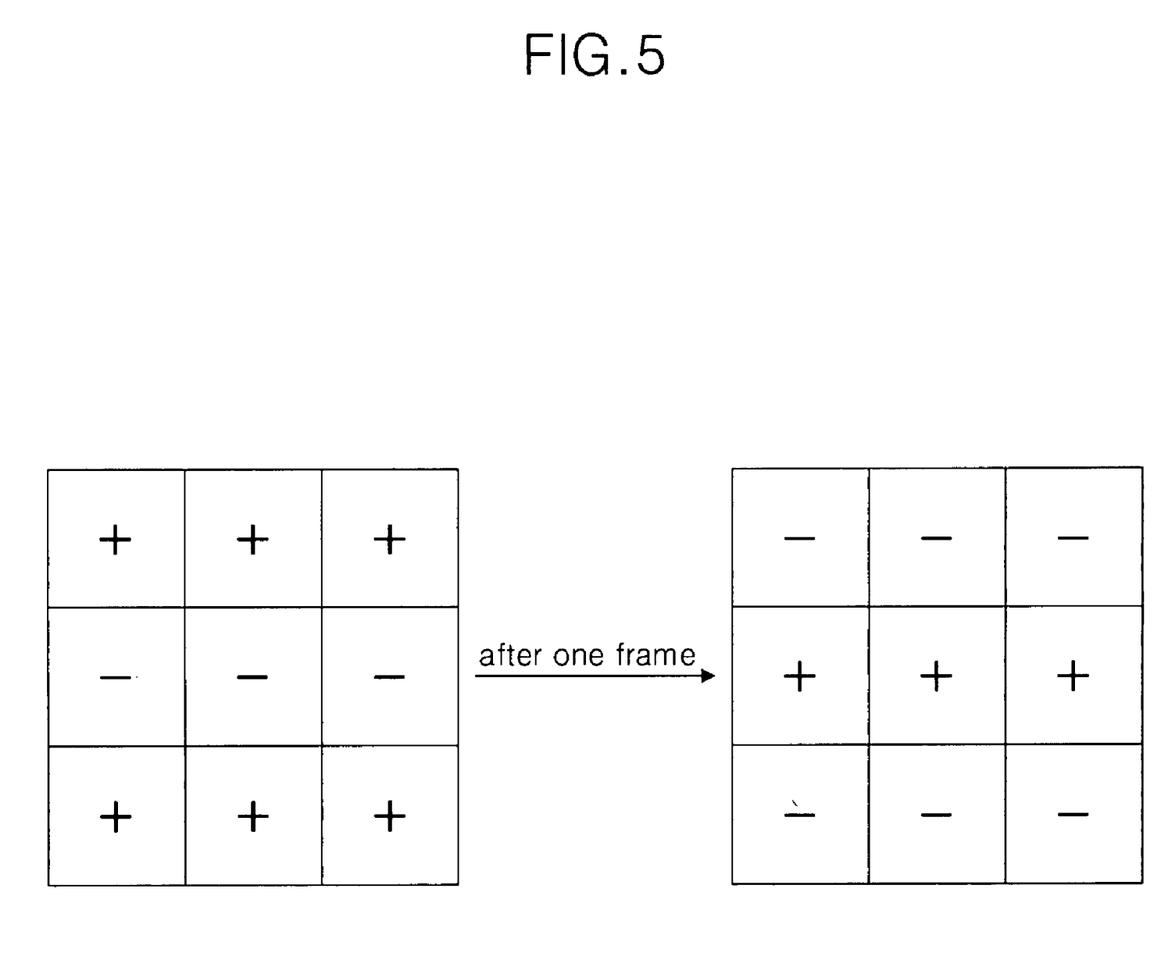
FIG. 5 is a view illustrating a driving method of a storage line shown in FIG. 4.

FIG. 4 is an equivalent circuit diagram of a transreflective LCD apparatus according to an exemplary embodiment of the present invention.

Referring to FIG. 4, a transreflective LCD apparatus 10 according to an exemplary embodiment of the present invention includes a plurality of gate lines Gn, Gn+1, Gn+2, ..., (where n is a natural number) and a plurality of data lines Dm, Dm+1, Dm+2, Dm+3, ... (where m is a natural number) that cross each other with at least one insulating layer disposed therebetween, and a plurality of storage lines STn, STn+1, ..., that is parallel with the plurality of gate lines Gn, Gn+1, Gn+2, ..., and is formed alternately with the plurality of gate lines Gn, Gn+1, Gn+2, ....

The plurality of gate lines Gn, Gn+1, Gn+2, ... are formed in a single layer or multilayer structure of chrome (Cr), Cr alloy, aluminum (Al), Al alloy, molybdenum (Mo), Mo alloy, silver (Ag), Ag alloy, etc. The plurality of gate lines Gn, Gn+1, Gn+2, ... supply a gate ON/OFF voltage received from a gate driver IC to respective gate electrodes of thin film transistors (TFTs) 60, 100, 150, 190, 240, 280, ... connected thereto. For this end, one side of each of the plurality of gate lines Gn, Gn+1, Gn+2, . . . is extended to be connected to the gate driver IC.

The plurality of data lines Dm, Dm+1, Dm+2, Dm+3, . . . are formed in a single layer or multilayer structure of Cr, Cr alloy, Al, Al alloy, Mo, Mo alloy, Ag, Ag alloy, titanium (Ti), Ti alloy, etc. The plurality of data lines Dm, Dm+1, Dm+2, Dm+3, . . . supply a data voltage received from a data driver IC to respective source electrodes of the TFTs 60, 100, 150, 190, 240, 280, . . . connected thereto. For this end, one end of each of the plurality of data lines Dm, Dm+1, Dm+2, Dm+3, . . . is extended to be connected to the data driver IC.

The plurality of storage lines STn, STn+1, . . . are made of the same material as the plurality of gate lines Gn, Gn+1, Gn+2, . . . and formed on the same plane as the plurality of gate lines Gn, Gn+1, Gn+2, . . . . The plurality of storage lines STn, STn+1, . . . supply a storage voltage received from a storage voltage supplier to respective storage electrodes of a plurality of storage capacitors 80, 120, 170, 210, 260, 300, . . . connected thereto. It is preferable that the storage voltage is applied by line inversion. Line inversion refers to inversion of the polarity of the storage voltage on one storage line in a frame such that the storage voltage that is applied to the storage line has a polarity that is different from the polarity of the corresponding storage line in the immediately preceding frame. The storage voltage swings while a gate OFF voltage is applied. In other words, the pulse of the storage voltage has the same form as a gate pulse and its output is later than the output of the gate pulse.

The transreflective LCD apparatus 10 further includes a plurality of subpixels Rx, Gx, Bx, Rx+1, Gx+1, Bx+1, . . . (where x is a natural number) defined by intersections of the plurality of gate lines Gn, Gn+1, Gn+2, . . . and the plurality of data lines Dm, Dm+1, Dm+2, Dm+3, . . . . Three adjacent subpixels constitute one pixel. For example, the first subpixel Rx defined by intersections of the two gate lines Gn and Gn+1 and the two data lines Dm and Dm+1, the second subpixel Gx defined by intersections of the two gate lines Gn and Gn+1 and the two data lines Dm+1 and Dm+2, and the third subpixel Bx defined by intersections of the two gate lines Gn and Gn+1 and the two data lines Dm+2 and Dm+3 constitute one pixel.

A plurality of first subpixels Rx, Rx+1, . . . , a plurality of second subpixels Gx, Gx+1, . . . , and a plurality of third subpixels Bx, Bx+1, . . . are respectively arranged in a row along the plurality of data lines Dm, Dm+1, Dm+2, Dm+3, . . . . The plurality of first subpixels Rx, Rx+1, . . . , the plurality of second subpixels Gx, Gx+1, . . . , and the plurality of third subpixels Bx, Bx+1, . . . have the same constituent elements, respectively. Therefore, in the interest of efficiency, only one Rx of the first subpixels, one Gx of the second subpixels and one Bx of the third subpixels will be described hereinbelow by way of example.

The first subpixel Rx has a transmissive region that passes the light irradiated from a backlight unit and a reflective region that reflects the light from an ambient light source.

The transmissive region of the first subpixel Rx includes the first TFT 60 connected to the gate line Gn and to the data line Dm, a first liquid crystal cell 70 connected to the first TFT 60, and the first storage capacitor 80 connected to the first liquid crystal cell 70.

The first TFT 60 supplies a data voltage from the data line Dm to a first transmissive electrode 90 of the first liquid crystal cell 70 in response to a gate ON/OFF voltage from the gate line Gn. The first TFT 60 includes a first gate electrode connected to the gate line Gn, a first source electrode connected to the data line Dm, a first drain electrode formed separately from the first source electrode by a predetermined distance, and an active layer that overlaps the first gate electrode with at least one insulating layer disposed between the active layer and the gate electrode. The active layer is connected to the first source electrode and to the first drain electrode.

The first gate electrode turns ON/OFF the first TFT 60 by using the gate ON/OFF voltage from the gate line Gn. The first source electrode supplies the data voltage from the data line Dm to the first drain electrode via a channel of the first TFT 60. The first drain electrode supplies the data voltage from the first source electrode to the first transmissive electrode 90 of the first liquid crystal cell 70. The active layer is made of polycrystalline silicon or amorphous silicon and forms the channel of the first TFT 60.

The first liquid crystal cell 70 includes the first transmissive electrode 90 and a common electrode 320 with liquid crystals having dielectric anisotropy disposed therebetween.

The liquid crystals control light transmittance by adjusting their orientation. The direction and the magnitude of this adjustment is determined by a difference between the transmissive voltage from the first transmissive electrode 90 and the common voltage from the common electrode 320. The liquid crystals consist of a material having positive or negative dielectric anisotropy. Preferably, the liquid crystals are driven in a vertically aligned (VA) mode. The first transmissive electrode 90 is formed of a transparent metal such as indium-tin-oxide (ITO) or indium-zinc-oxide (IZO). The first transmissive electrode 90 receives the data voltage from the first drain electrode and supplies the transmissive voltage to the liquid crystals. The common electrode 320 is formed of a transparent metal such as ITO or IZO and applies the common voltage from a common voltage generator to the liquid crystal. Preferably, the common voltage is a center value of a swing width of the data voltage, i.e., a direct current (DC) voltage.

The first storage capacitor 80 includes a first storage electrode and the first drain electrode (or the first transmissive electrode 90) with at least one insulating layer disposed therebetween.

The first storage electrode keeps the transmissive voltage applied by the first transmissive electrode 90 for one frame by using the storage voltage from the storage line STn connected thereto. The fist storage capacitor 80 can keep a capacitance charged to the first liquid crystal cell 70 for one frame because it is capacitively coupled to the first liquid crystal cell 70.

The reflective region of the first subpixel Rx includes the second TFT 100 connected to the gate line Gn and to the data line Dm, the second liquid crystal cell 110 connected to the second TFT 100, and the second storage capacitor 120 connected to the second liquid crystal cell 110.

The second TFT 100 overlaps a first reflective electrode 130 and supplies the data voltage from the data line Dm to the first reflective electrode 130 in response to the gate ON/OFF voltage from the gate line Gn. To this end, the second TFT 100 includes a second gate electrode connected to the gate line Gn, a second source electrode connected to the data line Dm, a second drain electrode formed separately from the source electrode by a predetermined distance, and an active layer that overlaps the second gate electrode with at least one insulating layer disposed between the active layer and the second gate electrode. The active layer is connected to the second source electrode and to the second drain electrode.

The second gate electrode turns ON/OFF the second TFT 100 by using the gate ON/OFF voltage from the gate line Gn. The second source electrode supplies the data voltage from the data line Dm to the second drain electrode via a channel of the second TFT 100. The second drain electrode supplies the data voltage from the second source electrode to the first reflective electrode 130 of the second liquid crystal cell 110. The active layer forms the channel of the second TFT 100.

The second liquid crystal cell 110 includes the first reflective electrode 130 and the common electrode 320 with the liquid crystals of dielectric anisotropy disposed therebetween. The second liquid crystal cell 110 has the same cell gap as the first liquid crystal cell 70.

The liquid crystals control the amount of light that is transmitted by adjusting their orientation. The direction and magnitude of this adjustment is determined by a difference between the reflective voltage from the first reflective electrode 130 and the common voltage from the common electrode 320. The first reflective electrode 130 is formed of an opaque metal having high reflectance such as Al or Al alloy. The first reflective electrode 130 receives the data voltage from the second drain electrode and applies the reflective voltage to the liquid crystals. The common electrode 320 applies the DC common voltage to the liquid crystals.

The second storage capacitor 120 includes a second storage electrode and the second drain electrode (or the first reflective electrode 130) with at least one insulating layer disposed therebetween.

The second storage electrode keeps the reflective voltage applied by the first reflective electrode 130 for one frame by using the storage voltage from the storage line STn connected thereto. In other words, the second storage capacitor 120 can keep a capacitance charged to the second liquid crystal cell 110 for one frame because it is capacitively coupled to the second liquid crystal cell 110.

Figure 6:
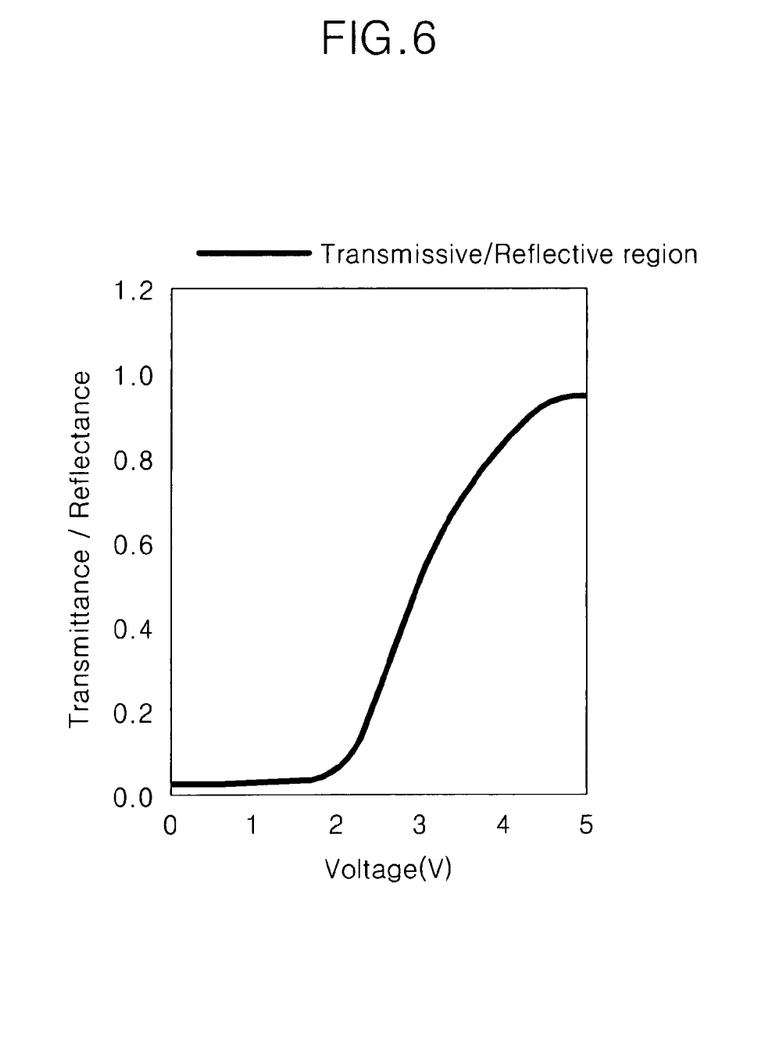
FIG. 6 is a view illustrating electro-optical characteristics in transmissive and reflective regions of the transreflective LCD apparatus of FIG. 4.

The first and second liquid crystal cells 70 and 110 are capacitively coupled to each other because they receive the same DC common voltage from the common electrode 320, and the first and second storage capacitors 80 and 120 are capacitively coupled to each other because they receive the same storage voltage from the storage line STn. That is, the first liquid crystal cell 70, second liquid crystal cell 110, first storage capacitor 80 and second storage capacitor 120 are capacitively coupled. Therefore, electro-optical characteristics in the transmissive region and the reflective region can be controlled to look like the curve in FIG. 6 by varying the capacitances of the first and second liquid crystal cells 70 and 110 and the first and second storage capacitors 80 and 120. Namely, the first transmissive electrode 90 and the first reflective electrode 130 are charged by the turning ON/OFF of the first and second TFTs 60 and 100, respectively, and the floated transmissive voltage and reflective voltage are respectively applied thereto by line inversion. Furthermore, the first transmissive electrode 90 and the first reflective electrode 130 are differently bootstrapped by using the swung storage voltage, thereby equalizing the electro-optical characteristics in the transmissive and reflective regions of the first subpixel Rx.

In the transreflective LCD apparatus 10, the first and second TFTs 60 and 100 are arranged in the first subpixel Rx to separate nodes of the transmissive and reflective regions of the first subpixel Rx. In order to vary the magnitudes of bootstrap voltages of the transmissive and reflective regions of the first subpixel Rx, the first liquid crystal cell 70 and the first storage capacitor 80 are formed in the transmissive region of the first subpixel Rx, and the second liquid crystal cell 110 and the second storage capacitor 120 are formed in the reflective region of the first subpixel Rx. The capacitances of the first liquid crystal cell 70 and the first storage capacitor 80 of the transmissive region of the first subpixel Rx and the capacitances of the second liquid crystal cell 110 and the second storage capacitor 120 of the reflective region of the first subpixel Rx can be obtained from the following equation (1). In other words, the capacitances of the first liquid crystal cell 70 and the first storage capacitor 80 can be determined suitable to a storage voltage ΔVst and a bootstrap voltage ΔVp to be bootstrapped in the transmissive region of the first subpixel Rx. Likewise, the capacitances of the second liquid crystal cell 110 and the second storage capacitor 120 can be determined to bootstrap the storage voltage ΔVst and the bootstrap voltage ΔVp in the reflective region of the first subpixel Rx.

$$\Delta Vp = \left(\frac{Cst}{Cst + Clc}\right)\Delta Vst \quad (1)$$

The capacitances of the first liquid crystal cell 70 and the first storage capacitor 80 can be achieved by varying the areas of the first transmissive electrode 90 of the first liquid crystal cell 70 and the first storage electrode of the first storage capacitor 80 after they are determined by the above equation (1). Likewise, the capacitances of the second liquid crystal cell 110 and the second storage capacitor 120 can be achieved by varying the areas of the first reflective electrode 130 of the second liquid crystal cell 110 and the second storage electrode of the second storage capacitor 120 after they are determined by the above equation (1). At this time, it is preferable that the capacitance of the fist storage capacitor 80 is different from that of the second storage capacitor 120. In other words, it is preferable that the area of the first storage electrode of the first storage capacitor 80 is different from of the area of the second storage electrode of the second storage capacitor 120.

Figure 7:
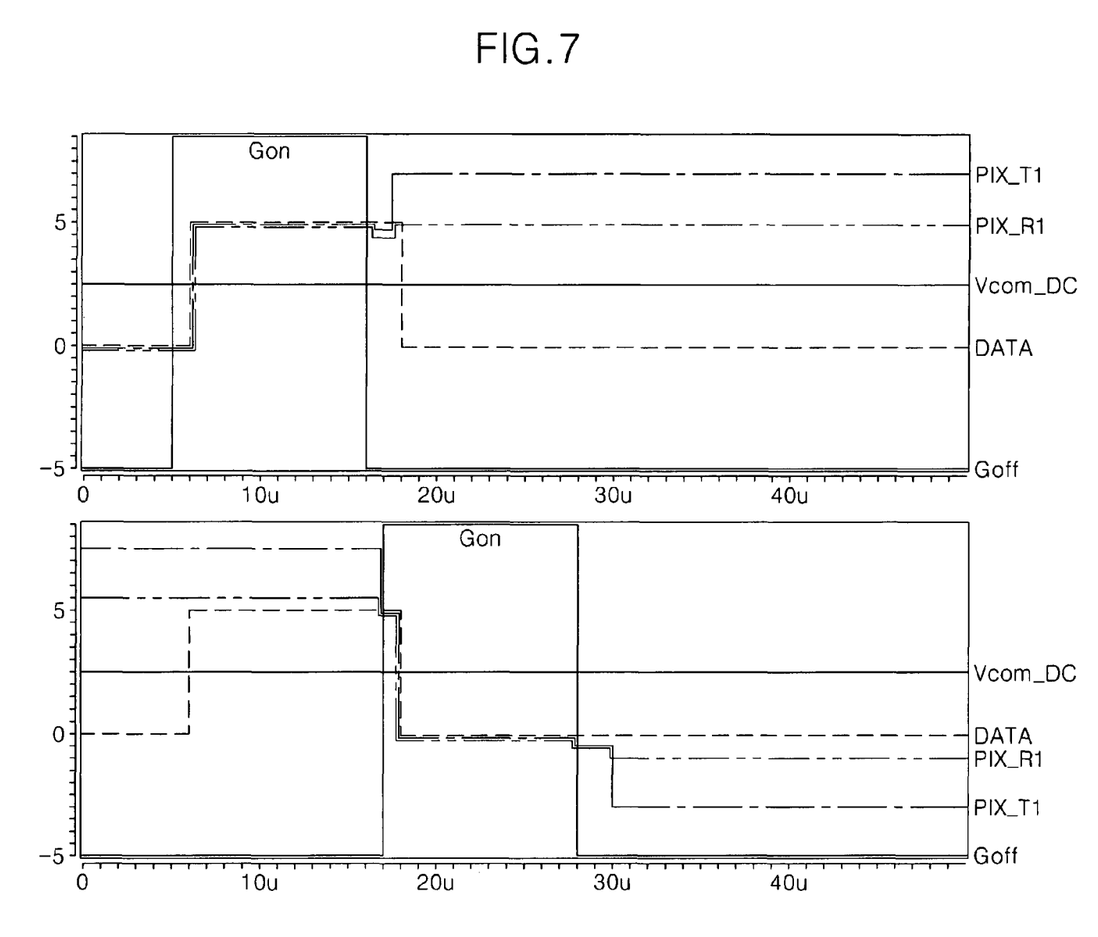
FIG. 7 is a waveform chart illustrating the driving of the transreflective LCD apparatus of FIG. 4.

The common voltage is fixed, as illustrated in FIG. 7, to a DC voltage that is a center value of a swing width of the data voltage DATA. A transmissive voltage PIX_T1 and a reflective voltage PIX_R1 of the same magnitude are respectively applied to the first transmissive electrode and the first reflective electrode of the first subpixel during a time period while the gate ON voltage Gon is applied to the first and second gate electrodes. As a result, the first and second liquid crystal cells have respective capacitances. Since the first and second liquid crystal cells are connected to the first and second storage capacitors, the first and second storage capacitors have respective capacitances. During a time period while a gate OFF voltage Goff is applied to the first and second gate electrodes, the storage voltage of the storage line connected to the first and second storage capacitors swings. In other words, the storage voltage swings while the first and second TFTs connected respectively to the first and second liquid crystal cells are turned off. As a result, the transmissive voltage PIX_T1 of the first transmissive electrode and the reflective voltage PIX_R1 of the first reflective electrode are bootstrapped by bootstrap voltages having different magnitudes, and the electro-optical characteristics in the transmissive and reflective regions are equalized. Therefore, the transreflective LCD apparatus according to the exemplary embodiment of the present invention achieves low power consumption by using the data voltage DATA having a narrow swing width and does not require the development of an additional driver IC. Furthermore, since the above apparatus can be accomplished even with a single cell gap, it increases the yield. By arranging the second TFT under the first reflective electrode, there is no loss in an aperture ratio. Since the first and second TFTs can be turned ON/OFF only by one gate line, the LCD apparatus is favorable in a charge margin.

Referring back to FIG. 4, each of the second and third subpixels Gx and Bx includes the transmissive region and the reflective region similar to those of the first subpixel Rx.

The transmissive region of the second subpixel Gx includes the third TFT 150 connected to the gate line Gn and to the data line Dm+1, a third liquid crystal cell 160 connected to the third TFT 150, and the third storage capacitor 170 connected to the third liquid crystal cell 160.

The third TFT 150 supplies the data voltage from the data line Dm+1 to a second transmissive electrode 180 of the third liquid crystal cell 160 in response to the gate ON/OFF voltage from the gate line Gn. The third liquid crystal cell 160 includes the second transmissive electrode 180 and the common electrode 320 with liquid crystals of a dielectric anisotropy disposed therebetween. The third liquid crystal cell 160 has the same cell gap as the first and second liquid crystal cells 70 and 110. The third storage capacitor 170 includes a third storage electrode and a third drain electrode of the third TFT 150 (or the second transmissive electrode 180) with at least one insulating layer disposed therebetween. The third storage electrode maintains a transmissive voltage applied by the second transmissive electrode 180 for one frame by using the storage voltage from the storage line STn connected thereto.

The reflective region of the second subpixel Gx includes the fourth TFT 190 connected to the gate line Gn and to the data line Dm+1, a fourth liquid crystal cell 200 connected to the fourth TFT 190 and the fourth storage capacitor 210 connected to the fourth liquid crystal cell 200.

The fourth TFT 190 overlaps a second reflective electrode 220 and supplies the data voltage from the data line Dm+1 to the second reflective electrode 220 of the fourth liquid crystal cell 200 in response to the gate ON/OFF voltage from the gate line Gn. The fourth liquid crystal cell 200 includes the second reflective electrode 220 and the common electrode 320 with the liquid crystals of a dielectric anisotropy disposed therebetween. The fourth liquid crystal cell 200 has the same cell gap as the third liquid crystal cell 160. The fourth storage capacitor 210 includes a fourth storage electrode and a fourth drain electrode of the fourth TFT 190 (or the second reflective electrode 220) with at least one insulation layer disposed therebetween. The fourth storage electrode maintains a reflective voltage applied by the second reflective electrode 220 for one frame by using the storage voltage from the storage line STn connected thereto.

The third liquid crystal cell 160, fourth liquid crystal cell 200, third storage capacitor 170 and fourth storage capacitor 210 are capacitively coupled. This varies the capacitance of each of the third and fourth liquid crystal cells 160 and 200 and the third and fourth storage capacitors 170 and 210, thereby equalizing the electro-optical characteristics in the transmissive region and the reflective region. Namely, the second transmissive electrode 180 and the second reflective electrode 220 are charged by the turning ON/OFF of the third and fourth TFTs 150 and 190, respectively, and the floated transmissive voltage and reflective voltage are respectively applied thereto by line inversion. Furthermore, the second transmissive electrode 180 and the second reflective electrode 220 are differently bootstrapped by using the swung storage voltage, thereby equalizing the electro-optical characteristics in the transmissive and reflective regions of the second subpixel Gx. The capacitances of the third and fourth liquid crystal cells 160 and 200 and the third and fourth storage capacitors 170 and 210 can be obtained by the above equation (1). It is preferable that the capacitance of the third storage capacitor 170 is different from that of the fourth storage capacitor 210. That is, it is preferable that the magnitude of the third storage electrode of the third storage capacitor 170 is different from that of the fourth storage electrode of the fourth storage capacitor 210.

The transmissive region of the third subpixel Bx includes the fifth TFT 240 connected to the gate line Gn and to the data line Dm+2, a fifth liquid crystal cell 250 connected to the fifth TFT 240 and the fifth storage capacitor 260 connected to the fifth liquid crystal cell 250.

The fifth TFT 240 supplies the data voltage from the data line Dm+2 to a third transmissive electrode 270 of the fifth liquid crystal cell 250 in response to the gate ON/OFF voltage from the gate line Gn. The fifth liquid crystal cell 250 includes the third transmissive electrode 270 and the common electrode 320 with the liquid crystals of dielectric anisotropy disposed therebetween. The fifth liquid crystal cell 250 has the same cell gap as the first to fourth liquid crystal cells 70, 110, 160 and 200. The fifth storage capacitor 260 includes a fifth storage electrode and a fifth drain electrode of the fifth TFT 240 (or the third transmissive electrode 270) with at least one insulation layer disposed therebetween. The fifth storage electrode maintains a transmissive voltage applied by the third transmissive electrode 270 for one frame by using the storage voltage from the storage line STn connected thereto.

The reflective region of the third subpixel Bx includes the sixth TFT 280 connected to the gate line Gn and to the data line Dm+2, a sixth liquid crystal cell 290 connected to the sixth TFT 280 and the sixth storage capacitor 300 connected to the sixth liquid crystal cell 290.

The sixth TFT 280 overlaps a third reflective electrode 310 and supplies the data voltage from the data line Dm+2 to the third reflective electrode 310 of the sixth liquid crystal cell 290 in response to the gate ON/OFF voltage from the gate line Gn. The sixth liquid crystal cell 290 includes the third reflective electrode 310 and the common electrode 320 with the liquid crystals of dielectric anisotropy disposed therebetween. The sixth liquid crystal cell 290 has the same cell gap as the fifth liquid crystal cell 250. The sixth storage capacitor 300 includes a sixth storage electrode and a sixth drain electrode of the sixth TFT 280 (or the third reflective electrode 310) with at least one insulation layer disposed therebetween. The sixth storage electrode maintains a reflective voltage applied by the third reflective electrode 310 for one frame by using the storage voltage from the storage line STn connected thereto.

The fifth liquid crystal cell 250, sixth liquid crystal cell 290, fifth storage capacitor 260 and sixth storage capacitor 300 are capacitively coupled. This varies the capacitances of the fifth and sixth liquid crystal cells 250 and 290 and the fifth and sixth storage capacitors 260 and 300, thereby equalizing the electro-optical characteristics in the transmissive and reflective regions. Namely, the third transmissive electrode 270 and the third reflective electrode 310 are charged by the turning ON/OFF of the fifth and sixth TFTs 240 and 280, respectively, and the floated transmissive voltage and reflective voltage are respectively applied thereto by line inversion. Furthermore, the third transmissive electrode 270 and the third reflective electrode 310 are differently bootstrapped by using the swung storage voltage, thereby equalizing the electro-optical characteristics in the transmissive and reflective regions of the third subpixel Bx. The capacitances of the fifth and sixth liquid crystal cells 250 and 290 and the fifth and sixth storage capacitors 260 and 300 can be obtained by the above equation (1). It is preferable that the capacitance of the fifth storage capacitor 260 is different from that of the sixth storage capacitor 300. That is, it is preferable that the magnitude of the fifth storage electrode of the fifth storage capacitor 260 is different from that of the sixth electrode of the sixth storage capacitor 300.

In order to independently control the bootstrap voltage of each of the first to third subpixels Rx, Gx and Bx, it is possible to vary the capacitances of the first, third and fifth storage capacitors 80, 170 and 260 by varying the magnitudes of the first, third and fifth storage electrodes of the first, third and fifth storage capacitors 80, 170 and 260. It is also possible to vary the capacitances of the second, fourth and sixth storage capacitors 120, 210 and 300 by varying the magnitudes of the second, fourth and sixth storage electrodes of the second, fourth and sixth storage capacitors 120, 210 and 300.

As is apparent from the foregoing description, the transreflective LCD apparatus and driving method thereof can control the magnitude of the bootstrap voltage in the transmissive region and reflective region of each subpixel. Therefore, the electro-optical characteristics in the transmissive and reflective regions can be equalized. Since the data voltage swings with a narrow width, low power consumption can be achieved and the development of an additional driver IC is unnecessary. Since the cell gaps of the transmissive and reflective regions are the same, the yield can be improved. The TFT for driving the reflective electrode of the reflective region can be overlapped by the reflective electrode, and thus the aperture ratio is not lowered. Since the TFTs formed in the transmissive and reflective regions of one subpixel can be turned ON/OFF by one gate line, the LCD apparatus is favorable in terms of a charge margin.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A transreflective liquid crystal display apparatus, comprising:
    first and second liquid crystal cells formed respectively in transmissive and reflective regions of a first subpixel;
    first and second thin film transistors connected respectively to the first and second liquid crystal cells; and
    first and second storage capacitors capacitively coupled to the first and second liquid crystal cells, respectively, the first and second storage capacitors having different capacitances from each other and including electrodes that are different from those of liquid crystal capacitors in the liquid crystal cells,
    wherein the first and second storage capacitors receive a storage voltage, and
    during a time period that the first and second thin film transistors are turned off, a transmissive voltage applied to the first liquid crystal cell and a reflective voltage applied to the second liquid crystal cell are controlled by the storage voltage and have different voltage levels from each other.

2. The transreflective liquid crystal display apparatus of claim 1, wherein areas of first and second storage electrodes of the first and second storage capacitors are different from each other.

3. The transreflective liquid crystal display apparatus of claim 1, further comprising:
    third and fourth liquid crystal cells formed respectively in transmissive and reflective regions of a second subpixel adjacent to the first subpixel;
    third and fourth thin film transistors connected respectively to the third and fourth liquid crystal cells; and
    third and fourth storage capacitors connected respectively to the third and fourth liquid crystal cells.

4. The transreflective liquid crystal display apparatus of claim 3, wherein capacitances of the third and fourth storage capacitors are different from each other.

5. The transreflective liquid crystal display apparatus of claim 4, wherein areas of third and fourth storage electrodes of the third and fourth storage capacitors are different from each other.

6. The transreflective liquid crystal display apparatus of claim 4, further comprising:
    fifth and sixth liquid crystal cells formed respectively in transmissive and reflective regions of a third subpixel adjacent to the second subpixel;
    fifth and sixth thin film transistors connected respectively to the fifth and sixth liquid crystal cells; and
    fifth and sixth storage capacitors connected respectively to the fifth and sixth liquid crystal cells.

7. The transreflective liquid crystal display apparatus of claim 6, wherein capacitances of the fifth and sixth storage capacitors are different from each other.

8. The transreflective liquid crystal display apparatus of claim 7, wherein magnitudes of fifth and sixth storage electrodes of the fifth and sixth storage capacitors are different from each other.

9. The transreflective liquid crystal display apparatus of claim 6, wherein capacitances of the first, third and fifth storage capacitors are different from each other.

10. The transreflective liquid crystal display apparatus of claim 9, wherein areas of the first, third and fifth storage electrodes of the first, third and fifth storage capacitors are different from each other.

11. The transreflective liquid crystal display apparatus of claim 6, wherein capacitances of the second, fourth and sixth storage capacitors are different from each other.

12. The transreflective liquid crystal display apparatus of claim 11, wherein areas of second, fourth and sixth storage electrodes of the second, fourth and sixth storage capacitors are different from each other.

13. The transreflective liquid crystal display apparatus of claim 6, wherein cell gaps of the first to sixth liquid crystal cells are the same.

14. The transreflective liquid crystal display apparatus of claim 6, further comprising:
    a plurality of gate lines and a plurality of data lines intersecting each other to define the first to third subpixels; and
    a storage line formed alternately with the plurality of gate lines and connected to the first to sixth storage capacitors.

15. The transreflective liquid crystal display apparatus of claim 1, wherein the first and second storage capacitors are connected to a same storage line.

16. The transreflective liquid crystal display apparatus of claim 1, wherein areas of first and second storage electrodes of the first and second storage capacitors are different from each other.

17. The transreflective liquid crystal display apparatus of claim 1, wherein the first and second thin film transistors are connected to a same data line and a same gate line.

18. The transreflective liquid crystal display apparatus of claim 1, wherein the first and second liquid crystal cells have a same cell gap.

* * * * *